350-96.1 SR
XR 3,250,172
ADDED
ENCE SEARCH ROOM

May 10, 1966 T. C. ABBOTT, JR., ETAL 3,250,172

OPTICAL CHARACTER READER SCANNING MEANS

CROSS REFERENCE

Filed Feb. 20, 1962

INVENTORS:
Tirey C. Abbott, Jr.
David B. Congleton
William H. Lawrence
Louis A Kline
By John J. Matlago
Nathan Cass
Their Attorneys

3250172
OR IN 250/567

3,250,172
Patented May 10, 1966

3,250,172

OPTICAL CHARACTER READER SCANNING MEANS

Tirey C. Abbott, Jr., Manhattan Beach, David B. Congleton, Torrance, and William H. Lawrence, Palos Verdes Estates, Calif., assignors to The National Cash Register Company, Dayton, Ohio, a corporation of Maryland Filed Feb. 20, 1962, Ser. No. 174,611
8 Claims. (Cl. 88—1)

This invention relates generally to means and methods for converting visual representations into corresponding electrical signals, and more particularly, to improved scanning means for use in an optical character reading system.

In recent years, considerable research and development has been undertaken in the search for improved character recognition systems which are capable of reading conventional printed information. The need for such character recognition systems has arisen because of the importance in modern day business operations of being able to feed conventional printed information on ordinary paper stock directly into computers and other similar equipment without the need of manually converting the printed information into a special computer code, as is otherwise necessary.

One of the most serious problems which the designers of character recognition systems have encountered arises because of the variations in reflectivity caused by defects and other imperfections in the paper stock, on which is printed the results of many conventional business machines, for example, cash registers. The problem of variations in reflectivity is most severe when the paper used is relatively thin having variable transmissivity in different portions thereof. Such variations introduce significant amounts of "paper noise" into the system which tends to obscure the presence of the printed characters and thereby makes detection thereof that much more difficult, resulting in the need for additional circuitry and added expense, as well as reducing overall system reliability.

Accordingly, it is the broad object of the present invention to provide improved optical scanning means.

More specifically, it is an important object of the present invention to provide optical scanning means which includes means for significantly reducing paper noise appearing on the paper on which the characters to be read are printed during the time that optical scanning is being performed thereon.

Another object of this invention is to provide optical scanning means, in accordance with either or both of the previous objects, which includes the additional feature of providing for convenient viewing by an operator of each of the characters when they are at the scanning station, thereby facilitating error checking, and/or the manual entry of badly distorted characters which cannot be read by the reading system.

A further object of the invention is to provide optical scanning means in accordance with any or all of the preceding objects which provides for compensation of the motion of an advancing character, or row of characters, so that a scan across a character, or a row of characters, will remain at the same constant level with respect thereto, even when the characters are advanced past the scanning station at high speed.

Briefly, the above objects are accomplished in a typical embodiment of an optical scanning system in accordance with the invention by causing a paper containing rows of characters printed on one side thereof to traverse a reading station, at which said one side is relatively highly illuminated for optical scanning thereof while the other side of the paper passes adjacent to a mirror-like reflecting member. In accordance with the present invention, it has been discovered that such an arrangement produces a most significant and unexpectedly large reduction in the paper noise appearing in the paper for a wide variety of types of paper stock, including paper stock of relatively poor quality, as well as relatively thin paper stock having appreciable variations in transmissivity. It thus becomes possible to use thin paper stock which would otherwise be unusable because of its relatively large variations in transmissivity. In addition, in this typical embodiment, the mirror-like member is designed to provide a light transmission (of the order of 10%) which is chosen in conjunction with the front illumination of the paper so that the characters present at the reading station may be transmitted therethrough and reflected by a mirror for convenient and undistorted viewing by an operator.

The typical embodiment summarized above further includes means by which compensation is automatically provided for the motion of an advancing row of characters so that each scan across a row will be substantially parallel thereto.

The specific nature of the present invention as well as other advantages, objects, and uses thereof will become apparent to those skilled in the art as disclosure is made in the following detailed description of the typical embodiment of the present invention illustrated in the accompanying drawing in which.

Like numerals designate like elements throughout the figures of the drawing.

Figures 1, 2, 3:
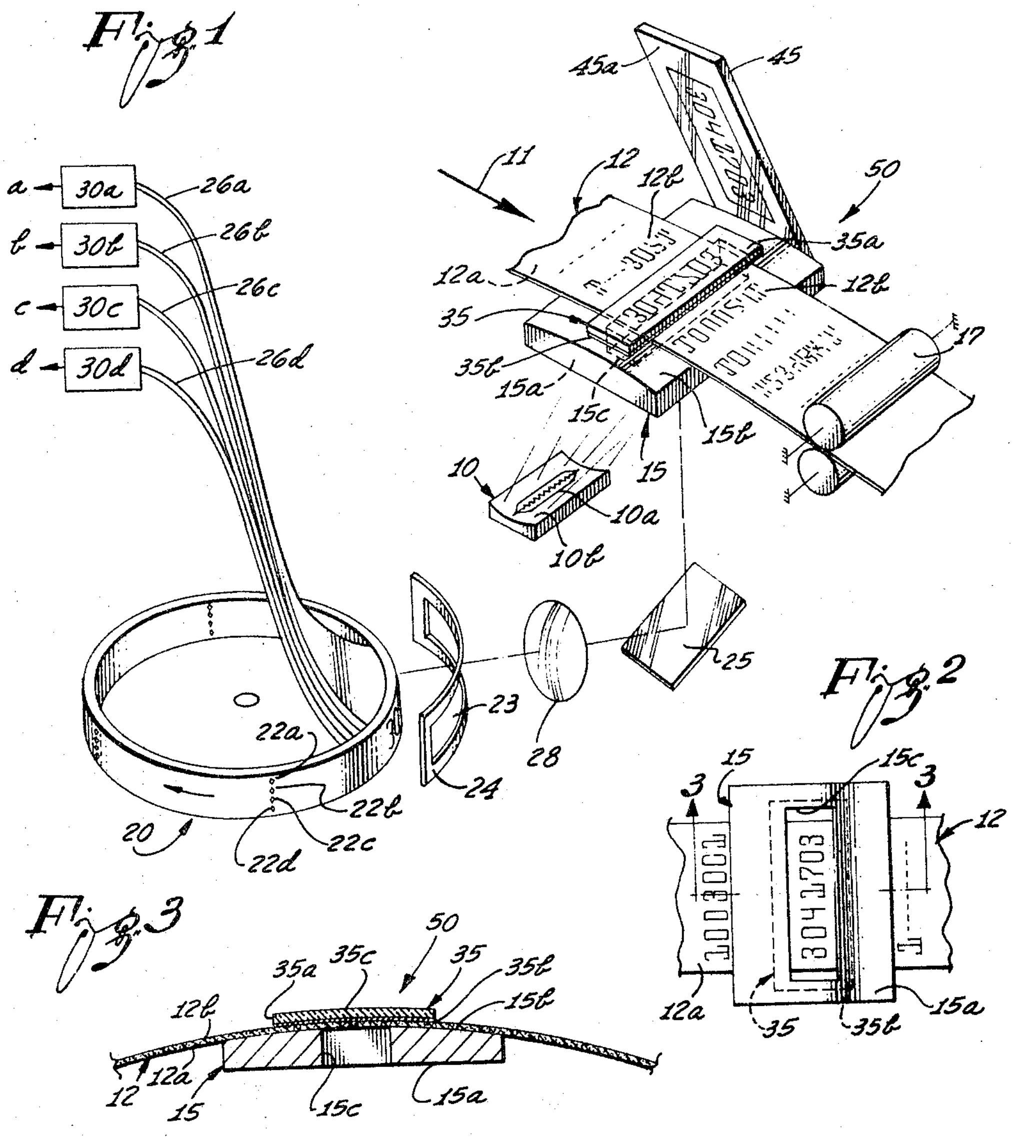
FIG. 1 is a pictorial schematic view of an optical scanning system in accordance with the invention.
FIG. 2 is a front view of the reading station 50 shown in FIG. 1.
FIG. 3 is a cross sectional view of the reading station 50 taken along the lines 3—3 in FIG. 2.

Referring to FIG. 1, a typical embodiment of an optical scanning system is illustrated which incorporates the improvements of the present invention. Broadly, such an optical scanning system as illustrated in FIG. 1 is of the type employed in the character recognition system disclosed in the commonly assigned copending patent application Serial No. 122,126, filed July 6, 1961. It is to be understood that while the present invention will be illustrated as incorporated in an optical scanning system of this type, the invention is not limited to such use, and may be employed in any other optical recognition system in which the features achieved by the present invention are desired.

Now considering the optical scanning means shown in FIG. 1 in detail, a paper tape 12 containing rows of printed characters on the front side 12*a* thereof, is advanced by paper drive means 17 in the direction of the arrow 11 so as to traverse a reading station generally indicated by the numeral 50 at which each row of characters is optically scanned. As shown in FIGS. 1–3, reading station 50 includes rectangular members 15 and 35 between which the paper tape 12 passes in response to the driving action of paper drive means 17, a portion of the front side 12*a* of paper tape 12 being visible through a rectangular slot 15*c* provided in member 15, as best shown in FIG. 2.

Member 15 may typically be of metal and its front face 15*a* including the visible portion of the front side 12*a* of paper tape 12 is preferably relatively highly illuminated by a light source 10 comprised of a lamp 10*a* and a reflector 10*b*. The front side 12*a* of the paper tape 12 is caused to slide over the back surface 15*b* of member 15 by any suitable means, such as by providing resilient shoes (not shown) and/or by providing vacuum pressure openings (also not shown) in member 15 which maintain the front side 12*a* of paper tape 12 in sliding contact with the back surface 15*b* of member 15. Also, for reasons which will hereinafter be explained, the back surface 15*b* is made slightly convex. The rectangular slot 15*c* in member 15 has its long dimension parallel to the rows of characters printed on the paper tape 12 in order to permit each row of characters to be sequentially illuminated by light source 10 for optical scanning thereof while in slot 15*c*.

As shown in FIGS. 2 and 3, member 35 which is adjacent to the back side 12*b* of paper tape 12 is made of sufficient size to completely overlap slot 15*c* of member 15. As best shown in FIG. 3, member 35 is comprised of a transparent glass layer 35*a* on which a mirror-like reflective coating 35*b* is provided, the glass layer 35*a* (and thus also the coating 35*b*) preferably having a concavity matching the convexity of the back surface 15*b* of member 15 in order to provide uniform reflection from the reflective coating 35*b* to all portions of the back side 12*b* of the paper tape 12 at the scanning station 50. Also, the spacing between the back side 12*b* of the paper tape 12 and the coating 35*b* is preferably chosen to be as small as practicable, but may vary with the particular optical scanning system employed.

The coating 35*b* on member 35 is further chosen to be slightly transparent (providing, for example, a transmission of the order of 5% to 15%) so as to permit the relatively high illumination directed by light source 10 on the characters in slot 15*c* to pass through paper 12, coating 35*b* and glass layer 35*a* forming an inverted or mirror-type image of the characters in slot 15*c* which is visible from the back side 35*c* of member 35, as shown in FIG. 1. A member 45 having a mirrored surface 45*a* is then provided at a convenient angle, as also shown in FIG. 1, to permit the characters in slot 15*c* to be conveniently viewed in their actual undistorted form in mirrored surface 45*a*. Thus, the characters appearing in slot 15*c* at any time may conveniently be viewed by an operator (whether or not tape 12 is moving) to check the reading operation, or to permit the manual entry of a character in the event the character is so illegible that it cannot be read by the character recognition system.

Besides permitting convenient viewing of the characters in slot 15*c*, the structure of the above-described reading station 50 is of very considerable value in significantly reducing paper noise appearing in the portion of the front side 12*a* of paper tape 12 which is exposed through slot 15*c* for optical scanning of the characters thereon. This most advantageous result has been discovered to occur because of the use of the mirror-like reflecting surface 35*b* adjacent to which the back side 12*b* of paper tape 12 passes while the front side 12*a* is visible through slot 15*c*. The mirror-like surface 35*b* has been found to very significantly reduce variations in reflectivity (which cause paper noise) appearing in the portion of the front side 12*a* of the paper tape 12 seen through slot 15*c*. The term "mirror-like" employed with respect to surface 35*b* is meant to refer to a surface whose specular component of reflection is the predominant one as distinguished from the component resulting from diffusion or scattering.

Optical scanning of the exposed row of characters in slot 15*c* of member 15 is now accomplished as follows. First, as shown in FIG. 1, an image of the row of characters in slot 15*c* is projected by way of mirror 25 and lens system 28 onto the periphery of a rotating drum 20. The rotating drum 20 is provided with groups of apertures spaced around the periphery of the drum 20, each group comprising four diamond-shaped apertures, such as illustrated at 22*a*, 22*b*, 22*c*, and 22*d*. Interposed between the drum 20 and the lens system 28 is a stationary shroud 24 shaped to surround a portion of the drum periphery and having a viewing slot or window 23 therein of sufficient size to permit a complete row of characters to be imaged on the drum periphery, the resulting image then being simultaneously scanned along four lateral paths by each group of four apertures as the group traverses the window 23.

Figure 4:
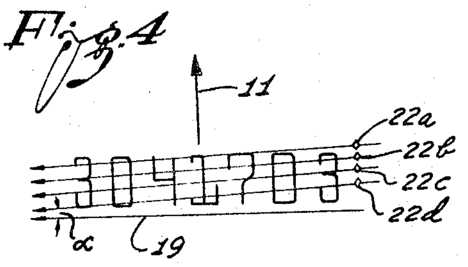
FIG. 4 is a schematic diagram illustrating the scan across a row of characters when compensation is not provided for the motion of the paper.

Mirror 25 is located with respect to slot 15*c* and light source 10 so that substantially only the diffused or scattered portion of the light reflected from the exposed portion of the paper tape 12 in slot 15*c* reaches the drum 20. The position of mirror 25 with respect to scanning station 50 is further chosen to provide compensation for the motion of the tape 12 as the row is being scanned so that a scan across a row of characters remains parallel therewith. The need for compensation is illustrated in FIG. 4 which diagrammatically represents the non-parallel manner in which a typical group of apertures 22*a*, 22*b*, 22*c* and 22*d* would scan a row of characters if no compensation were provided, that is, if the position of the mirror 25 with respect to the tape 12 were adjusted in the usual manner to obtain correct projection of a row of characters onto the drum periphery when the tape 12 is standing still. The angle $\alpha$ in FIG. 4 between the direction parallel to the row of characters, illustrated by arrow 19, and the direction of the scan paths of apertures 22*a*, 22*b*, 22*c*, and 22*d* is dependent on the tape speed as well as the scan speed provided by rotating drum 20; specifically, the angle $\alpha$ may be calculated as the angle whose tangent is the tape speed divided by the linear scan speed. For a given scan speed and tape speed, which in turn provides the given angle $\alpha$, the position of the tape 12 can be suitably rotated by the angle $\alpha$ in the direction which will provide the compensation required to achieve parallel scanning of each row of characters. Alternatively, compensation can be achieved by rotating the mirror 25 by a suitable angle.

It may be noted at this time that because the drum periphery is curved, a distorted and improperly focused image of a row of characters would appear thereon if the paper tape 12 is held in a flat position at the scanning station 50. This problem is conveniently avoided by choosing the convexity of the back surface 15*b* of member 15 and the matching concavity of the mirror-like surface 35*b* of member 35 so that the tape 12 at reading station 50 is maintained curved in a manner which will compensate for the curved periphery of drum 20 and thereby cause the characters projected on the drum periphery to be undistorted and in proper focus.

Continuing with the description of the optical scanning system diagrammatically illustrated in FIG. 1, it will be seen that four beam guides 26*a*, 26*b*, 26*c*, and 26*d*, formed of Lucite rods, for example, are positioned adjacent the inner peripheral surface of the drum 20 so as to receive the variations in light intensity seen by respective ones of each group of apertures 22*a*, 22*b*, 22*c* and 22*d*, as each group scans the image projected through window 23. Each portion of the beam guides 26*a*, 26*b*, 26*c*, and 26*d* which is adjacent the inner periphery of the drum 20 is chosen to have a thickness which is sufficient to intercept only the path of the respective one of the apertures 22*a*, 22*b*, 22*c*, and 22*d* corresponding thereto, and a width sufficient to extend over the entire row of characters projected through window 23. Each of the beam guides 26*a*, 26*b*, 26*c*, and 26*d*, therefore, receives the variations in intensity seen by its respective aperture during the scan of an entire row of characters.

The changes in light intensity thus applied to the portions of the beam guides 26*a*, 26*b*, 26*c*, and 26*d* adjacent the inner periphery of the drum 20 are transmitted therethrough to respective photosensitive elements 30*a*, 30*b*, 30*c*, and 30*d* to produce respective electrical signals *a*, *b*, *c*, and *d* which will then correspond to the variations in light intensity seen by each of the respective apertures 22*a*, 22*b*, 22*c*, and 22*d* as each group of apertures scans the image projected through window 23. The manner in which these signals *a*, *b*, *c*, and *d* are detected to recognize each character in the row will depend, of course, upon the type of character recognition system employed. A preferred embodiment of a particularly advantageous type of character recognition system in which the optical scanning system shown in FIG. 1 may be employed is disclosed in considerable detail in the aforementioned copending application Serial No. 122,126 but will not be considered herein since such matters are outside of the scope of this invention.

It is to be understood that the embodiment shown and described herein is only exemplary and that various modifications can be made both in construction and arrangement within the scope of the invention, as defined in the appended claims.

What is claimed is:

1. In an optical scanning system for optically scanning a paper containing data on one side thereof, a scanning station, means for causing said paper to traverse said scanning station for optical scanning of said one side thereof, and illuminating means for illuminating said one side of said paper as said paper traverses said station, said scanning station including a member having a transparent layer on which a slightly transparent mirror-like coating is provided in optical alignment with said illuminating means, said scanning station also including paper control means cooperating with said member for receiving said paper and urging the other side thereof against said slightly transparent mirror-like coating as said paper traverses said station, said paper control means also including means cooperating with said paper to permit predetermined portions of said one side of said paper to be exposed to said illuminating means in optical alignment therewith and with said mirror-like coating as the paper traverses said station the transparency of the paper and the transparent layer and the mirror-like coating of said member being chosen in conjunction with said illuminating means so that the data present on the illuminated portion of said one side of the paper at said station is visible from the back side of said member.

2. In an optical scanning system for optically scanning a paper containing data on one side thereof, a scanning station, means for causing said paper to traverse said scanning station for optical scanning of said one side thereof, illuminating means for illuminating said one side of said paper as said paper traverses said station, said scanning station including a member having a transparent layer on which a slightly transparent mirror-like coating is provided in optical alignment with said illuminating means, said scanning station also including paper control means cooperating with said member for receiving said paper and urging the other side thereof against said slightly transparent mirror-like coating as said paper traverses said station, said paper control means also including means cooperating with said paper to permit predetermined portions of said one side of said paper to be exposed to said illuminating means in optical alignment therewith and with said mirror-like coating as the paper traverses said station, the transparency of the paper and the transparent layer and the mirror-like coating of said member being chosen in conjunction with said illuminating means so that the data present on the illuminated portion of said one side of the paper at said station is visible from the back side of said member, and a reflecting member located with respect to the back side of the first mentioned member for providing a conveniently viewable image of the data present on the illuminated portion of said one side of the paper at said station.

3. In an optical scanning system for optically scanning a paper having rows of characters on one side thereof which rows are perpendicular to the direction of travel of said paper, a scanning station which said paper is caused to traverse for optical scanning of said one side thereof, said scanning station including first and second members between which said paper passes as it traverses said station, said first member being located adjacent said one side of said paper and having an illuminated opening therein of sufficient size to permit at least one row of characters to be exposed therethrough, said second member having a mirror-like surface located adjacent the other side of said paper and being of sufficient size to at least cover the opening in said first member, said paper and said second member and the mirror-like surface provided thereon being sufficiently transparent so as to permit a row of characters at said station to be visible from the back side of said second member.

4. In an optical scanning system for optically scanning a paper having rows of characters on one side thereof which rows are perpendicular to the direction of travel of said paper, the improvement comprising a scanning station which said paper is caused to traverse for optical scanning of said one side thereof, said scanning station including first and second members between which said paper passes as it traverses said station, said first member being located adjacent said one side of said paper and having an opening therein of sufficient size to permit at least one row of characters to be exposed therethrough, said second member comprising a transparent layer having a slightly transparent mirror-like coating thereon located so as to provide a mirror-like surface adjacent the other side of said paper, said mirror-like surface being of sufficient size to at least cover the opening in said first member, and illuminating means for illuminating the exposed portion of said one side of the paper which is visible through the opening in said first member, the transparency of the paper and the transparent layer and the mirror-like coating of said second member being chosen in conjunction with said illuminating means so that the illuminated characters in said opening are visible from the side of said second member which is opposite from the side adjacent said other side of the paper.

5. In an optical scanning system for optically scanning a paper having rows of characters on one side thereof which rows are perpendicular to the direction of travel of said paper, a scanning station which said paper is caused to traverse for optical scanning of said one side thereof, said scanning station including first and second members between which said paper passes as it traverses said station, said first member being located adjacent said one side of said paper and having an opening therein of sufficient size to permit at least one row of characters to be exposed therethrough, said second member comprising a transparent layer having a slightly transparent mirror-like coating thereon located so as to provide a mirror-like surface adjacent the other side of said paper, said mirror-like surface being of sufficient size to at least cover the opening in said first member, and illuminating means for illuminating the exposed portion of said one side of the paper which is visible through the opening in said first member, the transparency of the paper and the transparent layer and the mirror-like coating of said second member being chosen in conjunction with said illuminating means so that the illuminated characters in said opening are visible from the side of said second member which is opposite from the side adjacent said other side of the paper, and a reflecting member located with respect to said second member for providing a conveniently viewable undistorted image of the illuminated characters at the opening in said first member.

6. Optical scanning means for optically scanning a paper having rows of characters on one side thereof, said optical scanning means comprising in combination: a scanning station, drive means for causing said paper to traverse said station for optical scanning of said one side thereof, the direction of travel of said paper being perpendicular to said rows, said scanning station including first and second members between which said paper passes as it traverses said station, said first member being located adjacent said one side of said paper and having an opening therein of sufficient size to permit at least one row of characters to be exposed therethrough, said second member comprising a transparent layer having a slightly transparent mirror-like coating thereon located so as to provide a mirror-like surface adjacent the other side of said paper, said mirror-like surface being of sufficient size to at least cover the opening in said first member, illuminating means for illuminating the exposed portion of said one side of the paper which is visible through the opening in said first member, the transparency of the transparent layer and the mirror-like coating of said second member being chosen in conjunction with said illuminating means so that the illuminated characters in said opening are visible from the side of said second member opposite from the side adjacent to said other side of the paper, a rotating drum having scanning apertures in the outer periphery thereof, optical means for projecting the image at the opening in said first member onto the outer periphery of said drum for scanning by said apertures, said optical means including a mirror positioned with respect to said scanning station and said drum so as to compensate for said mirror and said scanning station being positioned with respect to one another at an angle removed from the proper position for zero paper speed by an amount which will compensate for the angle $\alpha$ occurring between the direction of scanning of the projected image on the drum periphery at zero paper speed and the direction of scanning resulting from the speed of movement of said paper past said scanning station, said angle $\alpha$ being approximately equal to the angle whose tangent is the paper speed divided by the linear scan speed of said apertures, and means cooperating with said apertures for producing electrical signals corresponding to the portions of the image scanned thereby.

7. Optical scanning means for optically scanning a paper having data on one side thereof, said optical scanning means comprising in combination: a scanning station, drive means for causing said paper to traverse said station for optical scanning of said one side thereof, illuminating means for illuminating said one side of said paper as said paper traverses said station, said scanning station including a member having a mirror-like surface adjacent to which the other side of said paper passes as the paper traverses said station, a rotating drum having scanning apertures in the outer periphery thereof, optical means for projecting the portion of the paper appearing at said station onto the outer periphery of said drum for scanning by said apertures, said optical means including a mirror, said mirror and said scanning station being positioned with respect to one another at an angle removed from the proper position for zero paper speed by an amount which will compensate for the angle $\alpha$ occurring between the direction of scanning of the projected image on the drum periphery at zero paper speed and the direction of scanning resulting from the speed of movement of said paper past said scanning station, said angle $\alpha$ being approximately equal to the angle whose tangent is the paper speed divided by the linear scan speed of said apertures, and means cooperating with said apertures for producing electrical signals corresponding to the portions of the image scanned thereby, said last-mentioned means including a plurality of beam guides located adjacent the inner periphery of said drum so as to receive the variations in intensity seen by said apertures while scanning the image projected on said drum, said last-mentioned means also including photosensitive elements to which the variations in intensity received by said beam guides are transmitted to provide electrical signals corresponding thereto.

8. Optical scanning means for optically scanning a paper having data on one side thereof, said optical scanning means comprising in combination: a scanning station, drive means for causing said paper to traverse said station for optical scanning of said one side thereof, illuminating means for illuminating said one side of said paper as said paper traverses said station, said scanning station including a member having a mirror-like surface adjacent to which the other side of said paper passes as the paper traverses said station, a rotating drum having scanning apertures in the outer periphery thereof, and optical means for projecting the portion of the paper appearing at said station onto the outer periphery of said drum for scanning by said apertures, said optical means including a mirror positioned with respect to said scanning station and said rotating drum so as to compensate for the motion of said paper by said drive means, said mirror and said scanning station being positioned with respect to one another at an angle removed from the proper position for zero paper speed by an amount which will compensate for the angle $\alpha$ occurring between the direction of scanning of the projected image on the drum periphery at zero paper speed and the direction of scanning resulting from the speed of movement of said paper past said scanning station, said angle $\alpha$ being approximately equal to the angle whose tangent is the paper speed divided by the linear scan speed of said apertures.

References Cited by the Examiner

UNITED STATES PATENTS

| | | | |
|---|---|---|---|
| 2,959,087 | 11/1960 | Strickland | 88—1 |
| 2,970,514 | 2/1961 | Collins | 88—24 |
| 3,102,995 | 9/1963 | Abbott et al. | |

OTHER REFERENCES

Bushor: "Optical Character Readers Use Memory Drums, Matrices To Increase Versatility," Electronics, vol. 35, No. 5, February 2, 1962, pages 26 and 27.

JEWELL H. PEDERSEN, *Primary Examiner.*

JOHN K. CORBIN, *Assistant Examiner.*